(No Model.)
E. B. VANVORCE.
PIPE CONNECTION.
No. 528,045. Patented Oct. 23, 1894.
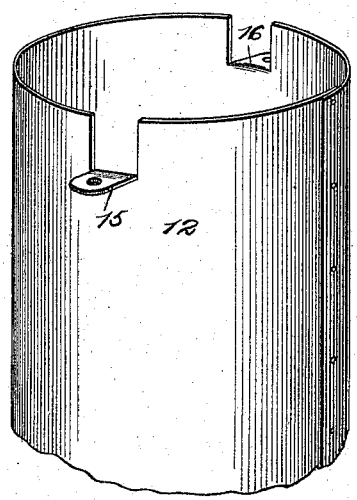
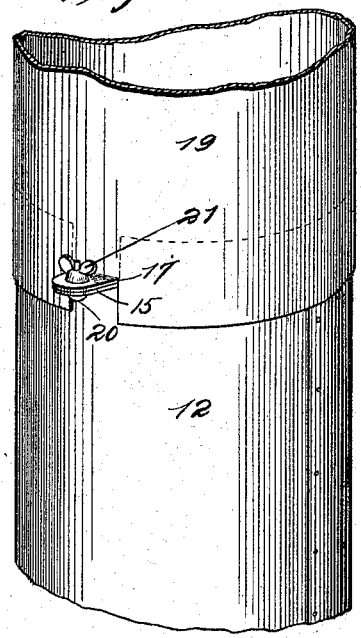
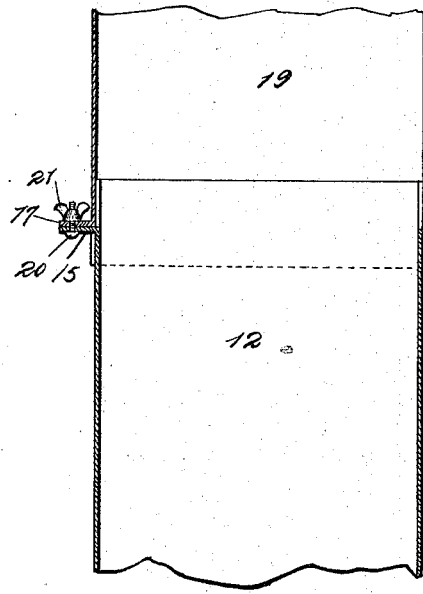
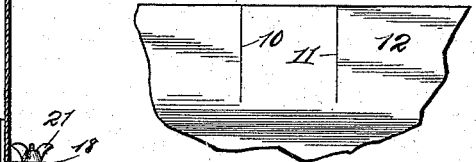
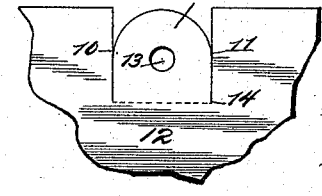
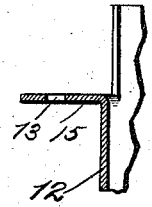
Attest:
M. P. Smith
T. T. Bunyan
Inventor:
Elizabeth B. Vanvorce
By Higdon & Higdon & Longan
Att'ys

UNITED STATES PATENT OFFICE.

ELIZABETH B. VANVORCE, OF MADISON, ILLINOIS.

PIPE CONNECTION.

SPECIFICATION forming part of Letters Patent No. 528,045, dated October 23, 1894.

Application filed April 30, 1894. Serial No. 509,474. (No model.)

*To all whom it may concern:*

Be it known that I, ELIZABETH B. VANVORCE, of the city of Madison, St. Clair county, State of Illinois, have invented certain new and useful Improvements in Pipe Connections, of which the following is a full, clear, and exact description, reference being had to the accompanying drawings, forming a part hereof.

The object of my invention is to provide improved means for interlocking, and securing against longitudinal and torsional movement, the mating end portions of two telescoping sheet-metal stove-pipe joints.

My invention consists in forming by slitting and bending the metal near the mating end portions of two telescoping sheet-metal stove-pipe joints, out-turned integral ears located a distance from the ends of said joints diametrically opposite each other, and detachably fastening the adjacent out-turned ears each to the other.

Referring to the drawings: Figure 1 is a perspective view of the upper portion of the lower joint. Fig. 2 is a perspective view of the upper portion of the lower joint, and the lower portion of the upper joint, showing the same connected. Fig. 3 is a central sectional elevation of Fig. 2. Figs. 4 and 5 are plans, showing the manner of forming the out-turned integral ears. Fig. 6 is a sectional detail elevation illustrating the manner of forming the out-turned ears.

In the construction of the device as shown, I first cut diametrically opposite pairs of parallel slits 10, 11 in the end portion of one of the joints of sheet-metal pipe 12, and then form the outer end portion of the section between the slits circular, and punching an aperture 13 therein, bend the same outwardly on the line 14, thus forming an ear 15, and then form a similar ear 16 diametrically opposite to the ear 15 and form like ears 17, 18 on the joint 19, said ears 17 and 18 being made the thickness of the metal shorter than the ears 15 and 16, the said joint 19 being adapted to inclose and telescope upon the joint 12, the limit of torsional and telescopic movement to be determined by contact of the ears with the adjacent edges of the slits and with each other. I then secure the ears 15, 17 and 16, 18, respectively, together by means of screws 20, and winged-nuts 21.

When it is desired to detach the mating ends of two joints, the ears may be quickly disconnected by the removal of the winged-nuts and screws, and the joints separated by longitudinal movement.

It is obvious that this device may be employed for connecting the mating ends of sheet-metal tubing for any purpose, and I have described the same in connection with stove-pipe for convenience only.

What I claim is—

The improved sheet-metal pipe connection, comprising two pieces of sheet-metal pipe placed in telescopic relation, said pipes having cut in their adjoining ends diametrically opposite pairs of parallel slits 10, 11 forming ears between said slits, said ears being bent outward at a right angle to the body of said pieces of pipe and provided with registering apertures 13, the ears upon the outer pipe being made shorter than the ears of the mating pipe an amount corresponding to the thickness of the metal, screws mounted in said apertures, and winged-nuts mounted on said screws, substantially as herein specified.

In testimony whereof I affix my signature in presence of two witnesses.

ELIZABETH B. VANVORCE.

Witnesses:
M. G. IRION,
JNO. C. HIGDON.